United States Patent
Breslau et al.

(10) Patent No.: US 9,460,307 B2
(45) Date of Patent: Oct. 4, 2016

(54) MANAGING SENSITIVE DATA IN CLOUD COMPUTING ENVIRONMENTS

(75) Inventors: Frank C. Breslau, Teaneck, NJ (US);
Benjamin Briggs, Austin, TX (US);
Ori Pomerantz, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 1636 days.

(21) Appl. No.: 12/816,061

(22) Filed: Jun. 15, 2010

(65) Prior Publication Data
US 2011/0307486 A1      Dec. 15, 2011

(51) Int. Cl.
*G06F 17/30*      (2006.01)
*G06F 21/62*      (2013.01)

(52) U.S. Cl.
CPC .................................. *G06F 21/6245* (2013.01)

(58) Field of Classification Search
USPC .................... 707/609, 687, 705, 790, 813
See application file for complete search history.

(56) References Cited

U.S. PATENT DOCUMENTS

| | | | |
|---|---|---|---|
| 6,880,002 B2 | 4/2005 | Hirschfeld et al. | |
| 7,437,440 B2 | 10/2008 | Manion et al. | |
| 7,574,496 B2 | 8/2009 | McCrory et al. | |
| 7,636,764 B1 | 12/2009 | Fein et al. | |
| 8,196,175 B2 | 6/2012 | Reed et al. | |
| 2006/0282884 A1 | 12/2006 | Pomerantz | |
| 2008/0104699 A1 | 5/2008 | Gounares et al. | |
| 2008/0195965 A1 | 8/2008 | Pomerantz | |
| 2009/0228950 A1 | 9/2009 | Reed et al. | |
| 2009/0235342 A1 | 9/2009 | Manion et al. | |
| 2011/0276806 A1* | 11/2011 | Casper ................. | G06F 21/602 713/189 |

OTHER PUBLICATIONS

Mell et al., "The NIST Definition of Cloud Computing", National Institute of Standards and Technology, Version 15, Oct. 7, 2009, pp. 1-2.
Lin et al.; "A Fast Parallel Algorithm for Discovering Frequent Patterns"; INSPEC/IEEE; pp. 398-403; 2009.
Qin et al.; "An Efficient Privacy Preserving Keyword Search Scheme in Cloud Computing"; INSPEC/IEEE; pp. 715-720; 2009.
Cong et al.; "Ensuring Data Storage Security in Cloud Computing"; INSPEC/IEEE; 2009.
Kandukuri et al.; "Cloud Security Issues"; INSPEC/IEEE; pp. 517-520; 2009.

(Continued)

*Primary Examiner* — Sana Al Hashemi
(74) *Attorney, Agent, or Firm* — Yee & Associates, P.C.; Gail H. Zarick (57) ABSTRACT

The illustrative embodiments provide a method, computer program product, and apparatus for managing collectively sensitive data. Collectively sensitive data is divided into a first partition for reassembly data, a second partition of the collectively sensitive data, and a third partition of the collectively sensitive data. Each of the second partition and the third partition are collectively nonsensitive in isolation. The first partition is stored in a translation table in a secure database. The translation table is configured for use in assembling collectively sensitive data from the second partition and the third partition. The second partition of the collectively sensitive data is stored in a first database associated with a first cloud computing environment. The third partition of collectively sensitive data is stored in a second database associated with a second cloud computing environment.

20 Claims, 6 Drawing Sheets

(56) References Cited

OTHER PUBLICATIONS

Jurczyk et al.; "Towards Privacy-Preserving Integration of Distributed Heterogeneous Data"; ACM Digital Library, Conference on Information and Knowledge Management, Proceeding of the 2nd PhD workshop on Information and knowledge management, Napa Valley, California, USA, pp. 65-75; Oct. 2008.

Raghavan et al.; "Secure and Policy-Compliant Source Routing"; ACM Digital Library/IEEE; vol. 17; Nol 3; IEEE/ACM Transactions on Networking (TON), vol. 17, Issue 3 (Jun. 2009) pp. 764-777.

* cited by examiner

MANAGING SENSITIVE DATA IN CLOUD COMPUTING ENVIRONMENTS

BACKGROUND

1. Field

The disclosure relates generally to an improved data processing system and more specifically to managing collectively sensitive data in cloud computing environments.

2. Description of the Related Art

Cloud computing is growing in popularity. Cloud computing is a type of computing in which shared resources are made available to computers through the Internet. In cloud computing, the logistics of the storage and/or service located in the cloud are abstracted from the user. Users of services in a cloud are typically unaware of the storage devices, servers, clusters, locations, and other logistics involved in delivering the service. In many cases, users are unaware of this information because the service is provided by an entity not within the control of the users.

For example, a user's electronic mail archives may be stored in a cloud of an external provider and available to the user over the Internet. The user is unaware of which server or servers actually store the archives or the physical location of the servers storing the archives. The external provider may move the archives to another server for maintenance or another reason without a perceivable difference to the user because the archives are still accessible at the same address on the Internet. While these examples describe clouds located on the Internet, one or more clouds can also exist on a private network.

Applications and/or data are often stored in clouds to ensure scalability. Scalability means that system resources are assigned to the application and data on an as-needed basis. The cloud may contain many more resources than are used at a particular time by any application running in the cloud or data stored in the cloud. The user or entity typically pays the provider of the cloud only for the amount of system resources used by the application or data. The user or entity frequently enjoys cost advantages by storing data and running applications in the cloud over maintaining a number of computer systems to store the data and run the applications. The user or entity typically enjoys such cost advantages because the user or entity does not pay for the acquisition and upkeep of computer systems to store data and run applications. Rather, the user or entity only pays for the resources used during a particular time period.

Storing data and running applications in the cloud can also be disadvantageous because the cloud is not owned or controlled by the user of the applications and/or data. Sensitive data stored in a cloud may be at risk of theft or misuse by providers of a cloud or other parties that may access the cloud. For example, banking transaction information may be at risk of theft or misuse by employees of the cloud provider or other parties that improperly gain access to cloud resources.

Thus, it would be advantageous to have a method and apparatus which takes into account one or more of the issues discussed above as well as possibly other issues.

SUMMARY

The illustrative embodiments provide a method, computer program product, and apparatus for managing collectively sensitive data. Collectively sensitive data is divided into a first partition for reassembly data, a second partition of the collectively sensitive data, and a third partition of the collectively sensitive data. Each of the second partition and the third partition are collectively nonsensitive in isolation. The first partition is stored in a translation table in a secure database. The translation table is configured for use in assembling collectively sensitive data from the second partition and the third partition. The second partition of the collectively sensitive data is stored in a first database associated with a first cloud computing environment. The third partition of collectively sensitive data is stored in a second database associated with a second cloud computing environment

DETAILED DESCRIPTION

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit", "module", or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disk read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including, but not limited to, wireless, wireline, optical fiber cable, RF, etc., or any suitable combination of the foregoing. Computer program code for carrying out operations for aspects of the present invention may be written in any combination of one or more programming languages, including an object-oriented programming language, such as Java, Smalltalk, C++, or the like and conventional procedural programming languages, such as the "C" programming language or similar programming languages.

The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some illustrative embodiments, computer readable media are present on both the user's computer and the remote computer or server. In such illustrative embodiments, some or all of the program code may be downloaded over the network from the computer readable medium at the remote computer or server. Aspects of the present invention are described below with reference to flowcharts and/or block diagrams of methods, apparatus (systems), and computer program products according to embodiments of the invention.

It will be understood that each block of the flowcharts and/or block diagrams and combinations of blocks in the flowcharts and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture, including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus, or other devices to produce a computer implemented process such that the instructions which operate on the computer or other programmable apparatus provide processes for implementing the functions/acts specified in the flowchart and/or block diagram block or blocks.

Figure 1:
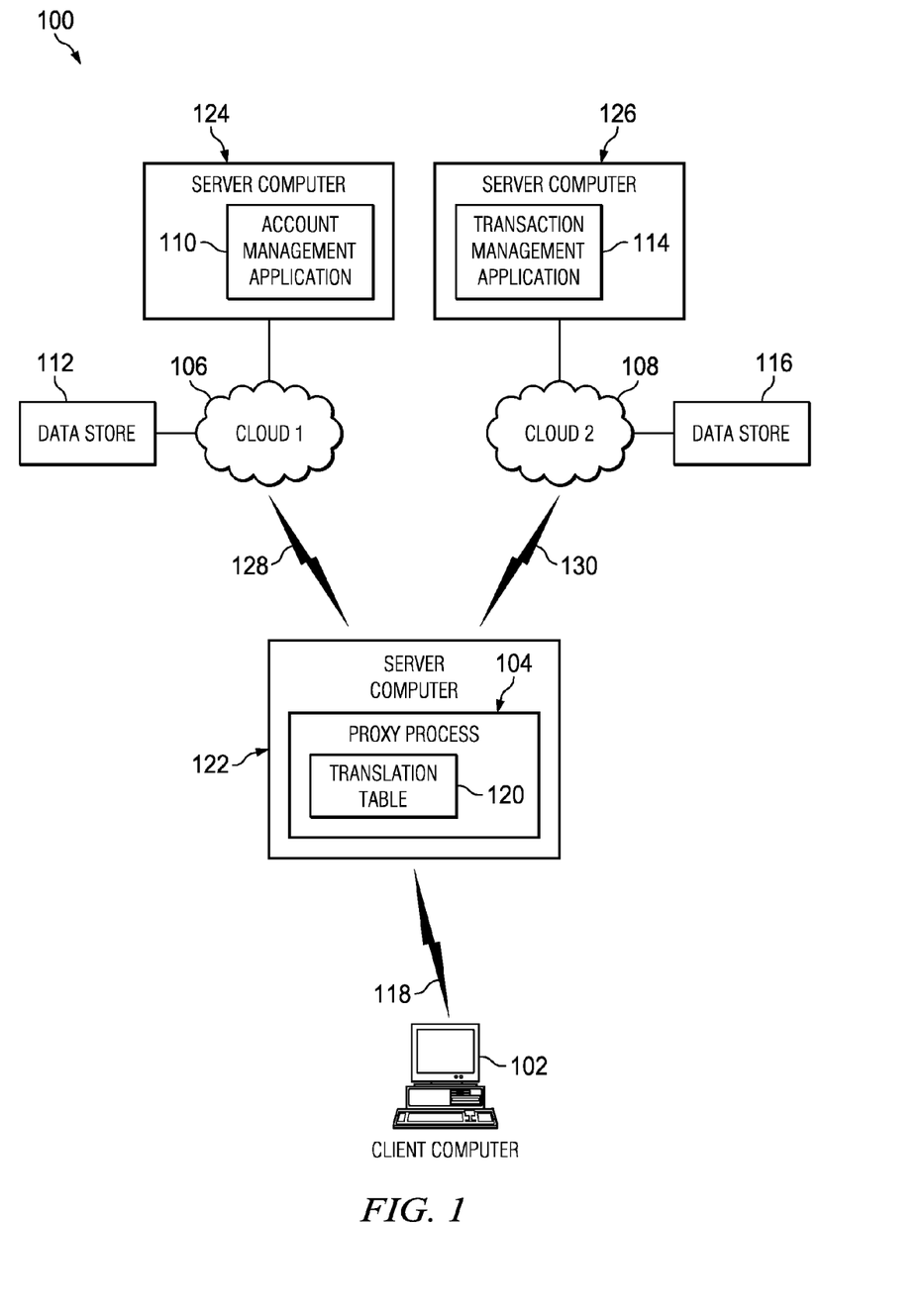
FIG. 1 is an illustration of a network data processing system depicted in accordance with an illustrative embodiment.

With specificity to FIG. 1, an illustration of a network data processing system is depicted in accordance with an illustrative embodiment. Network data processing system 100 contains client computer 102, proxy process 104, cloud 106, and cloud 108. Server computer 124 is associated with cloud 106. Server computer 124 may be associated with cloud 106 by being connected to cloud 106 using a network link or another suitable link. Server computer 124 runs account management application 110. Data store 112 is also associated with cloud 106 and accessible to server computer 124. Data store 112 may be stored in a network attached storage device, another server computer, or server computer 124. In these examples, cloud 106 is not controlled by the individual or entity that owns and/or controls proxy process 104.

Server computer 126 is associated with cloud 108. Server computer 126 runs transaction management application 114. Data store 116 is also associated with cloud 108 and is accessible to server computer 126. In these examples, cloud 108 is not controlled by the individual or entity that owns and/or controls proxy process 104.

A number of different processes may be performed in network data processing system 100 in accordance with an illustrative embodiment. For example, client computer 102 can request data from proxy process 104 running on server computer 124. Network data processing system 100 contains links 118, 128, and 130, which are communications links between various devices and computers connected together within network data processing system 100. Links 118, 128, and 130 may be created using one or more networks. A network is a medium used to provide communication links, such as links 118, 128, and 130. Client computer 102 may be, for example a personal computer or a network computer.

In some illustrative embodiments, server computer 122 provides information, such as boot files, operating system images, and applications to client computer 102. Of course, additional client computers may also connect to server computer 122. Program code located in network data processing system 100 may be stored on a computer readable storage medium and downloaded to a data processing system or other device for use. For example, program code may be stored on a computer readable storage medium on server computer 122 and downloaded to client computer 102 over link 118 for use on client computer 102.

In the depicted example, network data processing system 100 is the Internet representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN).

Client computer 102 transmits a request to proxy process 104 using link 118. Link 118 is a network link. For example, link 118 may be the Internet, or private network connection. Proxy process 104 receives the request from client computer 102. The request is for collectively sensitive data stored in network data processing system 100. Proxy process 104 is owned and/or controlled by an individual or entity responsible for providing access to the collectively sensitive data stored in network data processing system 100.

The request contains information about the records being requested. In these examples, the request contains user information for retrieving a list of financial transactions that contain the user described in the request. Proxy process 104 transmits the user information contained in the request to cloud 106. Cloud 106 runs account management application 110. Account management application 110, running on cloud 106, receives the user information from proxy process 104 and retrieves records from data store 112 that contain the user information received from proxy process 104.

Cloud 106 transmits the records retrieved from data store 112 to proxy process 104. The records transmitted by cloud 106 contain the user information received from proxy process 104 and a number of identifiers. The identifiers may be unique or non-unique. Proxy process 104 receives the records from cloud 106. Proxy process 104 also stores translation table 120. Translation table 120 contains a number of identifiers corresponding to records stored in cloud 106 and a number of corresponding identifiers for records contained in cloud 108. Proxy process 104 locates records in translation table 120 that match identifiers received in the records received from cloud 106 to identifiers used in records contained in cloud 108. Once proxy process 104 locates identifiers in translation table 120 that correspond to the identifiers received from cloud 106, proxy process 104 transmits the matching identifiers to cloud 108. Cloud 108 runs transaction management application 114 and stores data store 116. Cloud 108 receives a number of identifiers from proxy process 104 and retrieves records from data store 116 that contain the identifiers received from proxy process 104. Cloud 108 transmits the records retrieved from data store 116 to proxy process 104. Proxy process 104 reassembles the collectively sensitive data stored in network data processing system 100 from the records received from cloud 106 and cloud 108. Proxy process 104 reassembles the collectively sensitive data by replacing the identifiers in translation table 120 and sends the identifiers to cloud 106 and cloud 108 with the data received from cloud 106 and cloud 108. In other words, proxy process 104 replaces the identifiers in the records received from cloud 106 and cloud 108 with the portions of the collectively sensitive data stored in data store 112 and data store 116.

The different illustrative embodiments recognize and take into account a number of different considerations. The different illustrative embodiments recognize and take into account that storing collectively sensitive data and applications in a cloud is disadvantageous because the cloud is not owned or controlled by the owner or user of the data and applications. The cloud may store the collectively sensitive data in an insecure environment. For example, the cloud may store the collectively sensitive data on a physical computer system that is not secured against access by unauthorized individuals. Even individuals authorized by the cloud provider to access the computer systems storing the collectively sensitive data may steal or misuse the collectively sensitive data. In many cases, even detecting such theft or misuse is difficult or impossible. The cloud provider may also unintentionally disclose the collectively sensitive data to unauthorized parties, such as parties that recover discarded storage devices from the cloud provider.

The different illustrative embodiments recognize and take into account that storing portions of collectively sensitive data in a number of clouds can reduce or remove the risk of the collectively sensitive data being stolen or misused. For example, before storing a list of financial transaction records in the cloud, each financial transaction record can be split into a number of portions that do not individually contain sensitive data. In these examples, each record is split into three portions.

The different illustrative embodiments recognize and take into account a number of different considerations. For example, the different illustrative embodiments recognize and take into account that the number of portions can be created by replacing the parts of the collectively sensitive data that were removed from each portion of the collectively sensitive data with a number of identifiers. The number of identifiers may be unique or non-unique. By replacing the removed parts with a number of identifiers, the remaining information in each of the number of portions is not sensitive.

For example, removing the names John Smith and Jane Doe from a financial transaction record that describes a financial transaction in which John Smith transferred $100 to Jane Doe and replacing the names with identifiers yields three portions. The first portion contains John Smith and an identifier "ABC". The second portion contains Jane Doe and an identifier "DEF". The third portion contains $100 and two identifiers "QRS" and "XYZ." None of the first portion, the second portion, or the third portion contains sensitive information.

The different illustrative embodiments also recognize and take into account that a translation table can be generated to translate between the identifiers in reassembling the collectively sensitive data. In other words, the translation table identifies the identifiers that correspond to each other. Continuing with the previous example, the translation table contains a first entry that maps "ABC" to "QRS" and a second entry that maps "DEF" to "XYZ."

The different illustrative embodiments recognize and take into account that the translation table can be stored in a proxy server owned and/or controlled by the user or entity of the data. Upon receiving a request for the data, the number of portions can be retrieved from the clouds and reassembled into the collectively sensitive data using the translation table. Continuing with the previous example, a request may be received for financial transaction records involving John Smith. The proxy server receiving the request retrieves records from the cloud containing the account names that contain John Smith. The proxy server then finds the identifiers in the translation table that correspond to the identifiers in the records retrieved from the cloud containing the account names. The proxy server then retrieves records from the cloud containing the transaction information that contain the identifiers located in the translation table. Thus, the collectively sensitive data is reassembled and returned to the requestor.

For example, upon receiving a request for financial transaction records involving John Smith, the proxy server retrieves records from the cloud containing the account names that contain John Smith. In this illustrative example, the proxy server retrieves a record containing John Smith and the identifier "ABC." The proxy server then locates records in the translation table containing "ABC." In this illustrative example, the proxy server locates a record that maps "ABC" to "QRS." Next, the proxy server retrieves records from the cloud containing the transaction information that contain the identifier "QRS." Here, the proxy server receives a record containing $100, "QRS," and "XYZ." In some illustrative examples, the proxy server uses the translation table and the cloud containing the account names to retrieve the account name that corresponds to "XYZ" in the cloud containing the transaction information.

Thus, the illustrative embodiments provide a method, computer program product, and apparatus for managing collectively sensitive data. Collectively sensitive data is divided into a first partition for reassembly data, a second partition of the collectively sensitive data, and a third partition of the collectively sensitive data. Each of the second partition and the third partition are collectively nonsensitive in isolation. The first partition is stored in a translation table in a secure database. The translation table is configured for use in assembling collectively sensitive data from the second partition and the third partition. The second partition of the collectively sensitive data is stored in a first database associated with a first cloud computing environment. The third partition of collectively sensitive data is stored in a second database associated with a second cloud computing environment.

Figure 2:
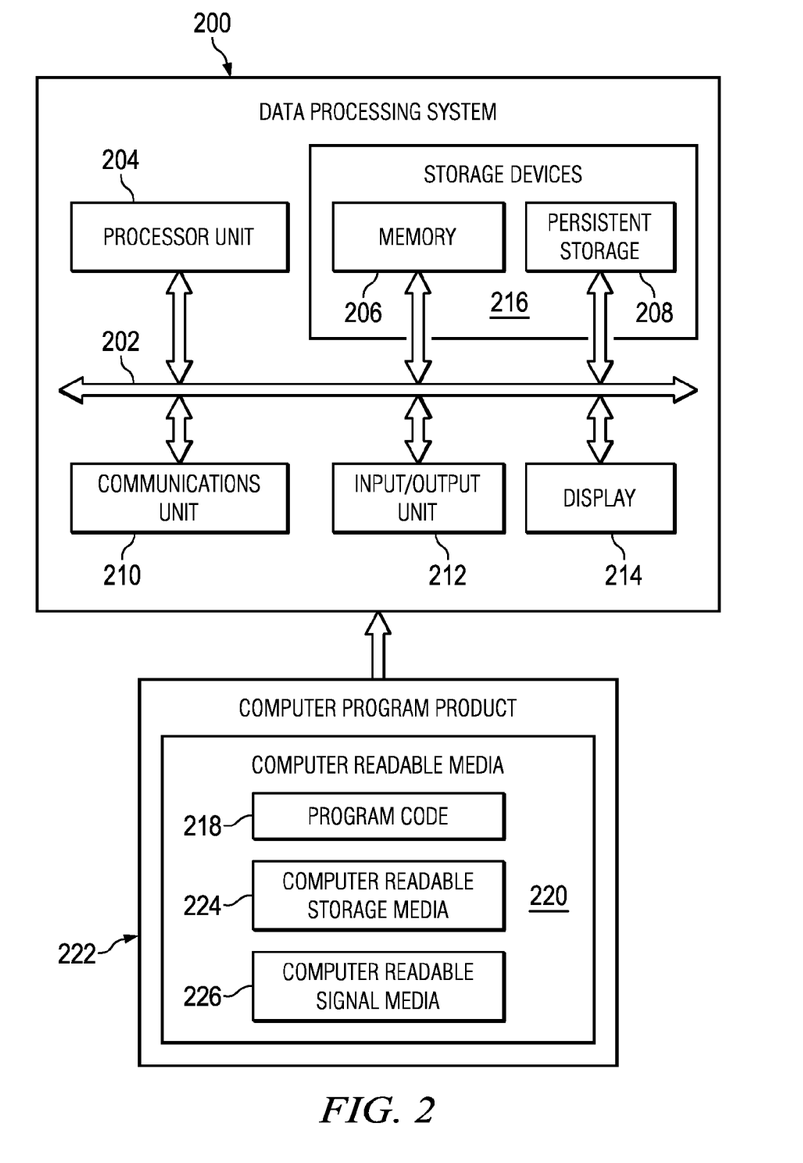
FIG. 2 is a diagram of a data processing system depicted in accordance with an illustrative embodiment.

Turning now to FIG. 2, a diagram of a data processing system is depicted in accordance with an illustrative embodiment. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a number of processors, may be a multi-processor core, or some other type of processor, depending on the particular implementation. A "number", as used herein, with reference to an item, means "one or more items". Further, processor unit 204 may be implemented using a number of heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or computer readable storage media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be computer readable storage media 224 or computer readable signal media 226. Computer readable storage media 224 may include, for example, an optical or magnetic disc that is inserted or placed into a drive or other device that is part of persistent storage 208 for transfer onto a storage device, such as a hard drive that is part of persistent storage 208. Computer readable storage media 224 also may take the form of a persistent storage, such as a hard drive, a thumb drive, or a flash memory that is connected to data processing system 200. In some instances, computer readable storage media 224 may not be removable from data processing system 200. In these illustrative examples, computer readable storage media 224 is a non-transitory computer readable storage media.

Alternatively, program code 218 may be transferred to data processing system 200 using computer readable signal media 226. Computer readable signal media 226 may be, for example, a propagated data signal containing program code 218. For example computer readable signal media 226 may be an electro-magnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 218 may be downloaded over a network to persistent storage 208 from another device or data processing system through computer readable signal media 226 for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208 and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Figure 3:
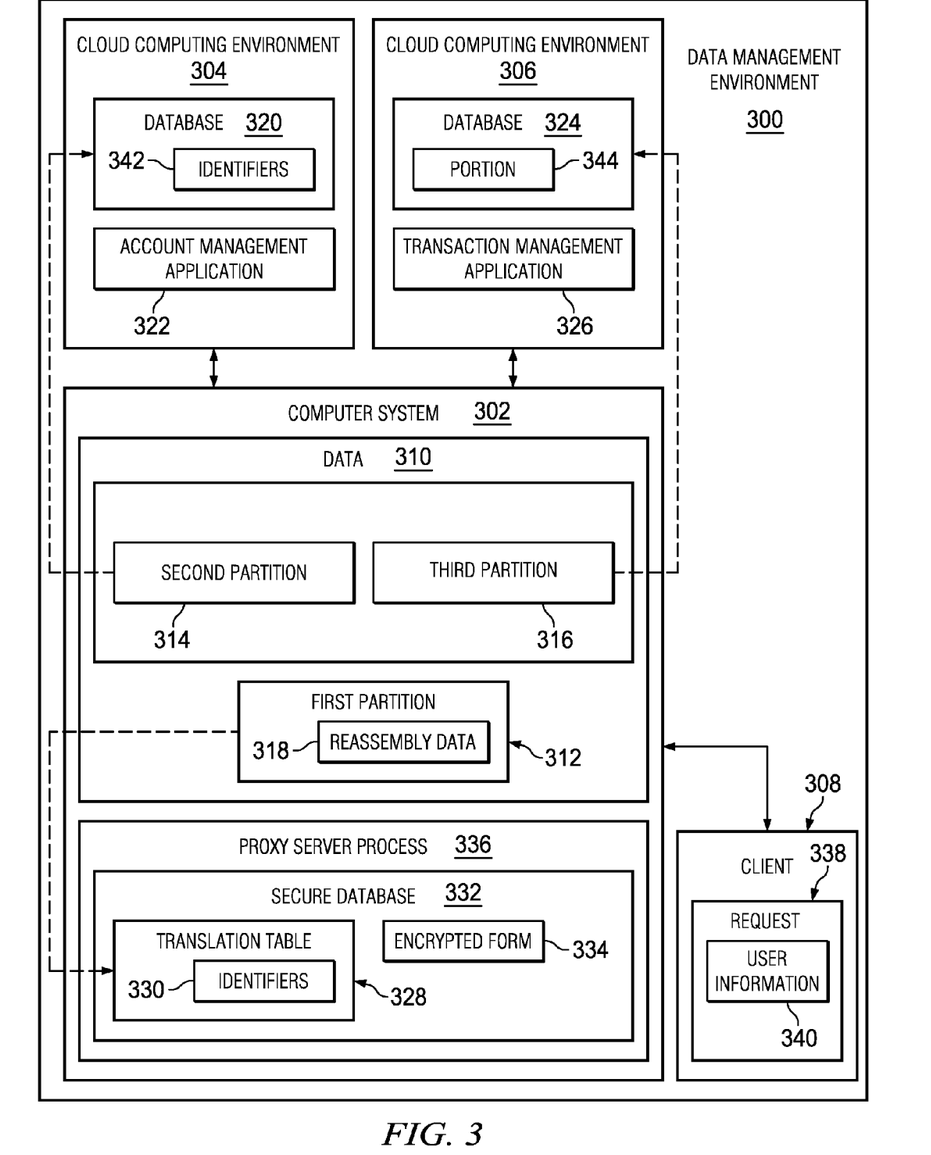
FIG. 3 is an illustration of a data management environment depicted in accordance with an illustrative embodiment.

Turning now to FIG. 3, an illustration of a data management environment is depicted in accordance with an illustrative embodiment. Data management environment 300 is an example implementation of network data processing system 100 in FIG. 1. Data management environment 300 is an environment in which network data processing system 200 in FIG. 2 may be implemented. Data management environment 300 contains computer system 302, cloud computing environment 304, cloud computing environment 306, and client 308.

Computer system 302 is an example implementation of data processing system 200 in FIG. 2. Computer system 302 receives data 310. Data 310 may be received over a network connection, may be input by a user, or may be loaded from a removable media. Data 310 is collectively sensitive data. "Collectively sensitive data", as used herein, means data that contains information unsuitable to be stored in a cloud computing environment, such as cloud computing environment 304, because the information is confidential. For example, data 310 may contain company and/or customer financial transaction information, trade secret information, personally identifiable information, or other personal or private information. Data 310 may also be government classified information or other controlled information. Collectively sensitive data may be divided into a number of partitions such that the confidential information may not be obtained without all the partitions of the collectively sensitive data.

Computer system 302 divides data 310 into first partition 312, second partition 314, and third partition 316. First partition 312 contains reassembly data 318. Reassembly data is data that can be used to reassemble second partition 314 and third partition 316 into data 310. Second partition 314 and third partition 316 are data that are collectively nonsensitive. "Collectively nonsensitive" means that the contents of second partition 314 are not sensitive when isolated from other portions of data 310, and the contents of third partition 316 are not sensitive when isolated from other portions of data 310. First partition 312, second partition 314, and third partition 316 can be reassembled into data 310. In other words, collectively sensitive data, such as data 310, may be reassembled from first partition 312, second partition 314, and third partition 316.

Second partition 314 is a portion of data 310. Third partition 316 is a portion of data 310 different from second partition 314. In these examples, second partition 314 is account names and third partition 316 is transaction lists. Second partition 314 and third partition 316 are selected from data 310 based on a set of rules that identify portions of data 310 that are collectively nonsensitive. The set of rules are created by a human. Second partition 314 may be joined with an identifier in identifiers 342 so computer system 302 may retrieve second partition 314 and reassemble data 310. Likewise, third partition 316 may be joined with or a separate identifier so computer system 302 may retrieve third partition 316 and reassemble data 310.

Computer system 302 transmits second partition 314 to cloud computing environment 304. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

For convenience, the Detailed Description includes the following definitions which have been derived from the "Draft NIST Working Definition of Cloud Computing" by Peter Mell and Tim Grance, dated Oct. 7, 2009, which is cited in an IDS filed herewith, and a copy of which is attached thereto.

Cloud computing environment 304 is a number of computer systems, storage devices, and/or network connections that provide computing resources to a number of customers by dividing some operations between the number of computer systems, storage devices, and/or network connections and performing these operations collectively. Cloud computing environment 304 is not under the exclusive control of the user or entity that controls computer system 302. For example, cloud computing environment 304 may consist of a number of computer systems operating in a cluster. The computing resources consist of any combination of data storage, data processing time, data transmission or reception over a network, or another suitable resource. Cloud computing environment 304 is configured to track the amount of the computer resources used by a customer. In many illustrative embodiments, cloud computing environment 304 provides computing resources to a plurality of customers at the same time. In these examples, cloud computing environment 304 is controlled by a different entity than computer system 302.

More specifically, cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly release to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

Cloud computing environment 304 stores second partition 314 in database 320. Cloud computing environment 304 is a number of computers, storage devices, and network connections that are owned and/or controlled by an individual or entity different than the individual or entity that owns or controls computer system 302. In these examples, the user or entity that owns and/or controls computer system 302 is unaware of the physical location of the data stored in cloud computing environment 304 and the particular computer systems on which applications are run. In this illustrative embodiment, cloud computing environment 304 runs account management application 322.

Computer system 302 also transmits third partition 316 to cloud computing environment 306. Cloud computing environment 306 is a number of computer systems, storage devices, and/or network connections that provide computing resources to a number of customers by dividing some operations between the number of computer systems, storage devices, and/or network connections and performing these operations collectively. Cloud computing environment 306 is not under the exclusive control of the user or entity that controls computer system 302. For example, cloud computing environment 306 may consist of a number of computer systems operating in a cluster. The computing resources consist of any combination of data storage, data processing time, data transmission or reception over a network, or another suitable resource. Cloud computing environment 306 is configured to track the amount of the computer resources used by a customer. In many illustrative embodiments, cloud computing environment 306 provides computing resources to a plurality of customers at the same time. In these examples, cloud computing environment 306 is controlled by a different entity than computer system 302. In this illustrative embodiment, cloud computing environment 306 runs transaction management application 326.

Computer system 302 also stores first partition 312 in translation table 328. When computer system 302 divides data 310, computer system 302 generates the contents of first partition 312 such that the contents of first partition 312 may be used to reassemble second partition 314 and third partition 316 into data 310. In these examples, computer system 302 generates an identifier that is stored as part of second partition 314 and in first partition 312. Computer system 302 also generates an identifier stored with third partition 316 and in first partition 312. Thus, first partition 312 may be used to reassemble second partition 314 and third partition 316 into data 310.

Translation table 328 is stored in secure database 332. Secure database 332 is secure because secure database 332 is stored in encrypted form 334. In other illustrative embodiments, secure database 332 is secure because computer system 302 is stored in a physically secure location. Secure database 332 is associated with proxy server process 336.

Client 308 generates request 338 when client 308 or a user wishes to retrieve data 310. In these examples, client 308 wishes to retrieve financial transaction records for a particular user.

Request 338 contains user information 340. User information 340 is an identification of a user associated with data 310 that is to be retrieved. In these examples, user information 340 is a user name of the user making request 338 using client 308. Client 308 transmits request 338 to proxy server process 336 running on computer system 302. Proxy server process 336 transmits user information 340 to account management application 322 running on cloud computing environment 304.

Account management application 322 retrieves records in database 320 that contain user information 340. The records in database 320 that contain user information 340 also contain identifiers 342. Identifiers 342 were generated by computer system 302 when data 310 was divided into first partition 312, second partition 314, and third partition 316. In other illustrative embodiments, cloud computing environment generates updated identifiers 342 on a specified time interval. In such illustrative embodiments, cloud computing environment 304 may transmit updated identifiers to computer system 302 and computer system 302 stores the updated identifiers in translation table 328.

Once account management application 322 retrieves records containing user information 340 and identifiers 342, account management application 322 transmits the records to proxy server process 336. Proxy server process 336 uses identifiers 342 to identify matching records in translation table 328. Matching records are records that contain identifiers 342. Records that contain identifiers 342 in translation table 328 also contain identifiers 330. In these examples, identifiers 330 are different than identifiers 342. Proxy server process 336 transmits identifiers 330 to transaction management application 326 running on cloud computing environment 306. Transaction management application 326 retrieves portion 350 from database 324. Portion 344 is records in database 324 that contain identifiers 330. Transaction management application 326 transmits portion 344 to proxy server process 336. Proxy server process 336 then locates, within portion 344, any identifiers that were not in identifiers 330. Proxy server process 336 uses translation table 328 and account management application 322 to translate the identifiers from portion 344 as the other identifiers from portion 344 to information in database 320. In these examples, the other information retrieved from database 320 is the names of additional parties involved in the financial transactions requested in request 338. Proxy server process 336 replaces identifiers in portion 344 with the data retrieved from cloud computing environment 304 and user information 340 to form data 310. Data 310 is then returned to client 308.

In these examples, proxy server process 336 reassembles data 310 by replacing identifiers 330 in portion 344 with the data retrieved from account management application 322 using user information 340.

The illustration of computer system 302 in data management environment 300 is not meant to imply physical or architectural limitations to the manner in which different features may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, computer system 302 may divide data 310 into additional partitions beyond first partition 312, second partition 314, and third partition 316. Additionally, partitions, such as second partition 314, may be subdivided and stored in additional cloud computing environments, such as cloud computing environment 304. In some illustrative embodiments, request 338 does not contain user information 340. Instead, request 338 contains another piece of information, such as a key word or number.

Figure 4:
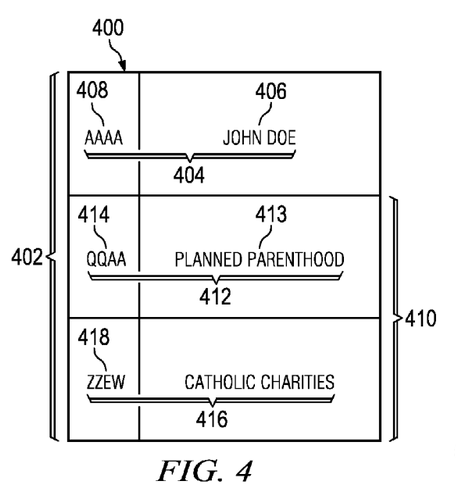
FIG. 4 is an illustration of a database associated with an account management application depicted in accordance with an illustrative embodiment.
Figure 5:
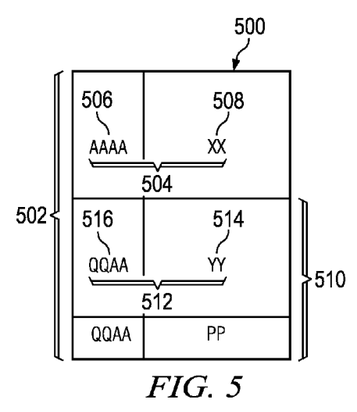
FIG. 5 is an illustration of a translation table in accordance with an illustrative embodiment.
Figure 6:
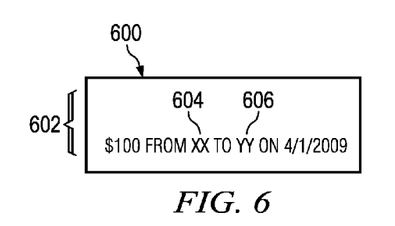
FIG. 6 is an illustration of a database associated with a transaction management application depicted in accordance with an illustrative embodiment.
Figure 7:
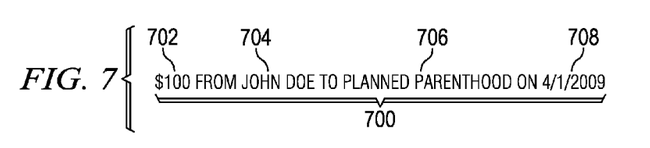
FIG. 7 is an illustration of reassembled data depicted in accordance with an illustrative embodiment.

FIGS. 4-7 illustrate an example of reassembling collectively sensitive data partially stored in multiple cloud computing environments. FIG. 4 depicts a database such as database 320, and FIG. 5 depicts a translation table such as translation table 328 in FIG. 3. FIG. 6 depicts a data store such as database 330 and FIG. 7 depicts reassembled data such as data 310 in FIG. 3.

Turning now to FIG. 4, an illustration of a database associated with an account management application is depicted in accordance with an illustrative embodiment. Database 400 is an example implementation of database 320 and associated with an account management application, such as account management application 322 in FIG. 3.

Database 400 contains records 402. Upon receiving user information, such as user information 340 in FIG. 3, the account management application associated with database 400 retrieves records that contain the user information. In this illustrative example, record 404 contains identifier 408, record 412 contains identifier 414, and record 416 contains identifier 418. The account management application receives user information for John Doe. Record 404 is identified in database 400 as containing John Doe 406. In this illustrative example, identifier 408 is "AAAA". Records 410 are not identified because records 410 do not contain John Doe. Records 410 consist of records 412 and 416 in this illustrative example. Identifier 408 is returned to the proxy server process that transmitted the user information.

In some illustrative embodiments, database 400 is stored in eXtensible Markup Language, hereinafter "XML," format. In other illustrative embodiments, database 400 is not stored in XML format, but records 402 are returned in XML format. For example, database 400 may be represented as the following XML data structure:

```
<AccountMappings>
    <AccountMapping>
        <AccountCode>AAAA</AccountCode>
        <AccountOwner>John Doe</AccountOwner>
    </AccountMapping>
    <AccountMapping>
        <AccountCode>QQAA</AccountCode>
        <AccountOwner>Planned Parenthood</AccountOwner>
    </AccountMapping>
    <AccountMapping>
        <AccountCode>ZZEW</AccountCode>
        <AccountOwner>Catholic Charities</AccountOwner>
    </AccountMapping>
</AccountMappings>
```

FIG. 5 depicts an illustration of a translation table in accordance with an illustrative embodiment. Translation table 500 is an example implementation of translation table 328 in FIG. 3. Translation table 500 may be associated with a proxy server process, such as proxy server process 336 in FIG. 3.

Translation table 500 contains records 502. The proxy server process associated with translation table 500 receives identifier 506 from the account management application. The proxy server process associated with translation table 500 then identifies records in records 502 that contain identifier 506. In this illustrative example, translation table 500 is searched for identifier "AAAA".

In this illustrative example, record 504 is identified because record 504 contains identifier 506. Identifier 506 corresponds to identifier 508. The proxy server process associated with translation table 500 retrieves record 504, including identifier 508. Records 510 are not identified by the proxy server process because records 510 do not contain identifier 508. In other words, records 510 do not contain identifier "AAAA". Once record 504 is retrieved from translation table 500, the proxy server process associated with translation table 500 transmits identifier 508 to transaction management application.

In some illustrative embodiments, database 500 is stored in XML format. In other illustrative embodiments, database 500 is not stored in XML format, but records 502 are returned in XML format. For example, database 500 may be represented as the following XML data structure:

```
<TranslationTable>
    <Mapping>
        <AccountCode>AAAA</AccountCode>
        <TransactionCode>XX</TransactionCode>
    </Mapping>
    <Mapping>
        <AccountCode>QQAA</AccountCode>
        <TransactionCode>YY</TransactionCode>
    </Mapping>
    <Mapping>
        <AccountCode>QQAA</AccountCode>
        <TransactionCode>PP</TransactionCode>
    </Mapping>
</TranslationTable>
```

Turning to FIG. 6, an illustration of a database associated with a transaction management application is depicted in accordance with an illustrative embodiment. Database 600 is an example implementation of database 324 in FIG. 3. Database 600 is associated with a transaction management application such as transaction management application 326 in FIG. 3.

The transaction management application associated with database 600 receives identifier 508 from the proxy server process associated with translation table 500 in FIG. 5. The transaction management application then identifies records in database 600 that contain identifier 508 in FIG. 5. In this case, identifier 508 in FIG. 5 is contained in record 602. In this illustrative example, identifier 508 in FIG. 5 corresponds to identifier 604 in record 602. The transaction management application then returns record 602 to the proxy server process associated with translation table 500 in FIG. 5. The proxy server process then identifies any unknown identifiers in record 602. In this illustrative example, identifier 606 is not presently known to the proxy server associated with translation table 500 in FIG. 5.

Thus, the proxy server process locates records in translation table 500 that contain identifier 606. In this illustrative example, record 512 is identified as containing identifier 514. Identifier 514 corresponds to identifier 606. The proxy server process then transmits identifier 516 to the account management application associated with database 400. The proxy server process transmits identifier 516 because identifier 516 is also contained in record 512. In this illustrative example, identifier 516 corresponds to identifier 514 in translation table 500.

The account management application associated with database 400 in FIG. 4 locates records that contain identifier 516. In this illustrative example, the account management application identifies record 412 in FIG. 4. The account management application then returns account name 413 in FIG. 4 to the proxy server process. In this illustrative example, account name 413 in FIG. 4 is Planned Parenthood.

In some illustrative embodiments, database 600 is stored in XML format. In other illustrative embodiments, database 600 is not stored in XML format, but record 602 is returned in XML format. For example, database 600 may be represented as the following XML data structure:

```
<CodedTransactions>
    <CodedTransaction>
        <Amount></Amount>
        <Source>XX</Source>
        <Destination>YY</Destination>
        <Date>4/1/9</Date>
    </CodedTransaction>
</CodedTransactions>
```

With specificity to FIG. 7, an illustration of reassembled data is depicted in accordance with an illustrative embodiment. Data 700 is an example implementation of data 310 in FIG. 3.

Once the proxy server process receives account name 413 in FIG. 4, all identifiers in record 602 in FIG. 6 have been translated into account names. Thus, data 700 represents the collectively sensitive data that was divided and stored in both the number of cloud computing environments. In this illustrative example, data 700 contains amount 702, account name 704, account name 706, and transaction date 708. The proxy server process returns data 700 to the client that requested data 700.

In some illustrative embodiments, data 700 is represented and/or stored in XML format. For example, data 700 may be represented as the following XML data structure:

```
<Transactions>
    <Transaction>
        <Amount></Amount>
        <Source>John Doe</Source>
        <Destination>Planned Parenthood</Destination>
        <Date>4/1/9</Date>
    </Transaction>
</Transactions>
```

Figure 8:
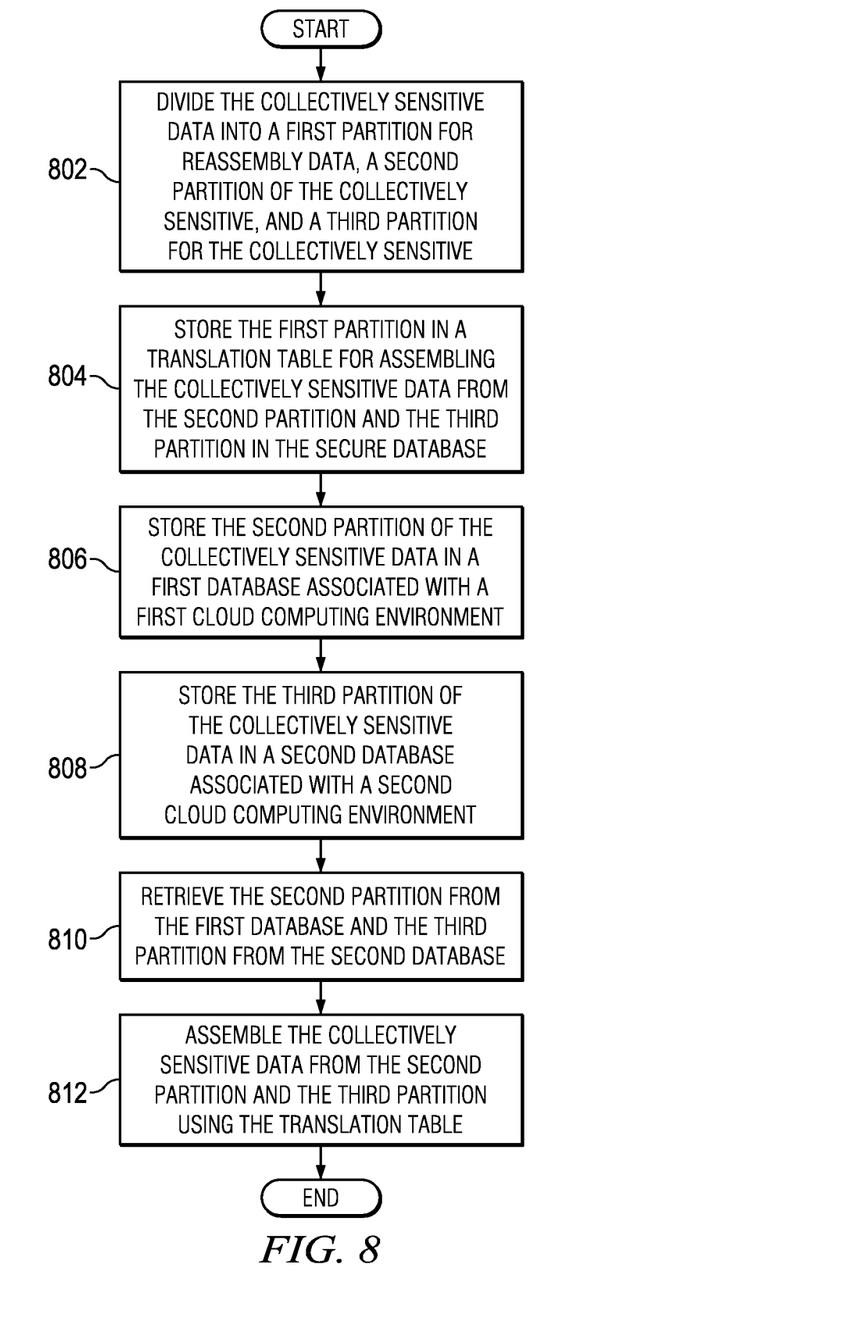
FIG. 8 is a flowchart of a process for a flowchart of a process for managing collectively sensitive data in accordance with an illustrative embodiment.

Turning now to FIG. 8, a flowchart of a process for managing collectively sensitive data is depicted in accordance with an illustrative embodiment. The process may be implemented by computer system 302 by data management environment 300.

The process begins by dividing the collectively sensitive data into a first partition for reassembly data, a second partition of the collectively sensitive data, and a third partition of the collectively sensitive data (step 802). Each of the second partition and the third partition of data are collectively nonsensitive in isolation from other data in collectively sensitive data. In other words, the second partition is collectively nonsensitive when isolated from the third partition, and the third partition is collectively nonsensitive when isolated from the second partition. "Collectively sensitive data", as used herein, means data that contains information unsuitable to be stored in a cloud computing environment, such as cloud computing environment 304 in FIG. 3, because the information is confidential. For example, data 310 in FIG. 3 may contain financial transaction records. Collectively sensitive data may be divided into a number of partitions such that none of the confidential information may be obtained without all the partitions of the collectively sensitive data. "Collectively nonsensitive" means that the contents of second partition are nonsensitive with respect to other data in the second partition. In other words, the contents of the second partition are not sensitive when isolated from other portions of the collectively sensitive data. Likewise, the contents of third partition are not sensitive when isolated from other portions of the collectively sensitive data, such as the contents of the second partition.

The process then stores the first partition in a translation table for assembling the collectively sensitive data from the second partition and the third partition in the secure database (step 804). The secure database is a database that is stored in encrypted form and/or stored on a computer system owned and/or controlled by an individual or entity that owns the collectively sensitive data. The process continues by storing the second partition of the collectively sensitive data in a first database associated with a first cloud computing environment (step 806).

The process stores the third partition of the collectively sensitive data in a second database associated with a second cloud computing environment (step 808). The process then retrieves the second partition from the first database and the third partition from the second database (step 810). The process may retrieve the second partition from the first database by requesting the second partition of the collectively sensitive data from a cloud computing environment that stores the second partition in a data store associated with the cloud computing environment.

Finally, the process assembles the collectively sensitive data from the second partition and the third partition using the translation table (step 812). In these illustrative embodiments, the process assembles the collectively sensitive data by restoring the collectively sensitive data to the form and order in which the collectively sensitive data was originally stored. The process terminates thereafter.

Figure 9:
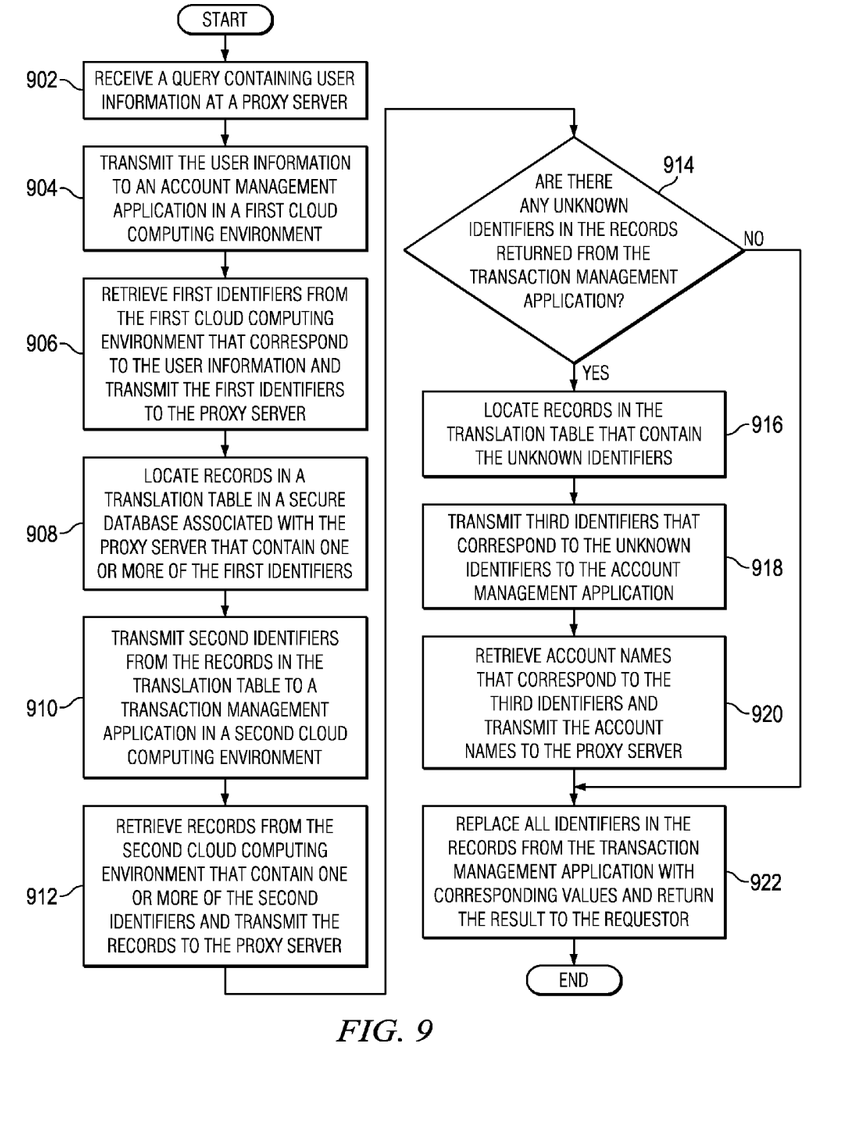
FIG. 9 is a flowchart of a process for reassembling collectively sensitive data in accordance with an illustrative embodiment.

Turning now to FIG. 9, a flowchart of a process for reassembling collectively sensitive data is depicted in accordance with an illustrative embodiment. The process may be implemented by computer system 302 in data management environment 300 in FIG. 3.

The process begins by receiving a query containing user information at a proxy server (step 902). The process then transmits the user information to an account management application in a first cloud computing environment (step 904).

The process retrieves first identifiers from the first cloud computing environment that correspond to the user information and transmits the first identifiers to the proxy server (step 906).

The process continues by locating records in a translation table in a secure database associated with the proxy server that contains one or more of the first identifiers (step 908). The process transmits the second identifiers from the records in the translation table to a transaction management application in a second cloud computing environment (step 910).

The process then retrieves records from the second cloud computing environment that contains one or more of the second identifiers and transmits the records to the proxy server (step 912).

The process determines if there are any unknown identifiers in the records returned from the transaction management application (step 914). If the process determines that there are no unknown identifiers in the records returned from the transaction management application, the process replaces all identifiers in the records from the transaction management application with corresponding values and returns the result to the requestor (step 922). The process terminates thereafter. If at step 914 the process determines that there are unknown identifiers in the records returned from the transaction management application, the process locates records in the translation table that contain the unknown identifiers (step 916). The process then transmits third identifiers that correspond to the unknown identifiers to the account management application (step 918). The process retrieves account names that correspond to the third identifiers and transmits the account names to the proxy server (step 920). The process returns to step 922 and terminates thereafter.

Thus, the illustrative embodiments provide a method, computer program product, and apparatus for managing collectively sensitive data. Collectively sensitive data is divided into a first partition for reassembly data, a second partition of the collectively sensitive data, and a third partition of the collectively sensitive data. Each of the second partition and the third partition are collectively nonsensitive in isolation. The first partition is stored in a translation table in a secure database. The translation table is configured for use in assembling collectively sensitive data from the second partition and the third partition. The second partition of the collectively sensitive data is stored in a first database associated with a first cloud computing environment. The third partition of collectively sensitive data is stored in a second database associated with a second cloud computing environment The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowcharts and combinations of blocks in the block diagrams and/or flowcharts can be implemented by special purpose hardware-based systems that perform the specified functions or acts or combinations of special purpose hardware and computer instructions.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of managing collectively sensitive data, the method comprising:
dividing the collectively sensitive data into a first partition for reassembly data, a second partition of the collectively sensitive data, and a third partition of the collectively sensitive data, wherein each of the second partition and the third partition are collectively nonsensitive in isolation;
storing the first partition in a translation table in a secure database, wherein the translation table is configured for use in assembling the collectively sensitive data from the second partition and the third partition;
storing the second partition of the collectively sensitive data in a first database associated with a first cloud computing environment; and
storing the third partition of the collectively sensitive data in a second database associated with a second cloud computing environment.

2. The method of claim 1 further comprising:
retrieving the second partition from the first database and the third partition from the second database; and
assembling the collectively sensitive data from the second partition and the third partition using the translation table.

3. The method of claim 2 further comprising:
receiving a request for the collectively sensitive data containing user information.

4. The method of claim 3, wherein the assembling step further comprises:
retrieving a number of identifiers from the second partition that correspond to the user information; and
retrieving a portion of the third partition based on the number of identifiers and the translation table.

5. The method of claim 4, wherein the number of identifiers is a first number of identifiers, and the step of retrieving the second portion of the third partition based on the number of identifiers and the translation table further comprises:
identifying a second number of identifiers in the second portion of the third partition that correspond to the first number of identifiers in the translation table; and
retrieving the portion of the third partition that contain the second number of identifiers.

6. The method of claim 1, wherein the first database and the first cloud computing environment are associated with an account management application, and the second database and the second cloud computing environment are associated with a transaction management application.

7. The method of claim 1, wherein the secure database is stored in an encrypted form and the secure database is stored in a proxy server.

8. The method of claim 3, wherein the secure database is stored in a proxy server and the request is received by the proxy server.

9. A computer program product comprising:
a non-transitory computer readable storage medium;
program code, stored on the non-transitory computer readable storage medium, for dividing collectively sensitive data into a first partition for reassembly data, a second partition of the collectively sensitive data, and a third partition of the collectively sensitive data, wherein each of the second partition and the third partition are collectively nonsensitive in isolation;
program code, stored on the non-transitory computer readable storage medium, for storing the first partition in a translation table in a secure database, wherein the translation table is configured for use in assembling the collectively sensitive data from the second partition and the third partition;
program code, stored on the non-transitory computer readable storage medium, for storing the second partition of the collectively sensitive data in a first database associated with a first cloud computing environment; and
program code, stored on the non-transitory computer readable storage medium, for storing the third partition of the collectively sensitive data in a second database associated with a second cloud computing environment.

10. The computer program product of claim 9 further comprising:
program code, stored on the non-transitory computer readable storage medium, for retrieving the second partition from the first database and the third partition from the second database; and
program code, stored on the non-transitory computer readable storage medium, for assembling the collectively sensitive data from the second partition and the third partition using the translation table.

11. The computer program product of claim 10 further comprising:
program code, stored on the non-transitory computer readable storage medium, for receiving a request for the collectively sensitive data containing user information.

12. The computer program product of claim 11, wherein the program code for assembling the collectively sensitive data from the second partition and the third partition using the translation table further comprises:
program code, stored on the non-transitory computer readable storage medium, for retrieving a number of identifiers from the second partition that correspond to the user information; and
program code, stored on the non-transitory computer readable storage medium, for retrieving a portion of the third partition based on the number of identifiers and the translation table.

13. The computer program product of claim 12, wherein the number of identifiers is a first number of identifiers, and the program code for retrieving the second portion of the third partition based on the number of identifiers and the translation table further comprises:
program code, stored on the non-transitory computer readable storage medium, for identifying a second number of identifiers in the second portion of the third partition that correspond to the first number of identifiers in the translation table; and
program code, stored on the non-transitory computer readable storage medium, for retrieving the portion of the third partition that contains the second number of identifiers.

14. The computer program product of claim 9, wherein the first database and the first cloud computing environment are associated with an account management application, and the second database and the second cloud computing environment are associated with a transaction management application.

15. The computer program product of claim 9, wherein the program code is downloaded over a network from a remote data processing system.

16. The computer program product of claim 9, wherein the non-transitory computer readable storage medium is a first non-transitory computer readable storage medium, and wherein the first non-transitory computer readable storage medium is associated with a server data processing system, and wherein the program code is downloaded over a network to a data processing system remote to the server data processing system for use with a second non-transitory computer readable storage medium associated with the data processing system remote to the server data processing system.

17. An apparatus comprising:
  a bus system;
  a storage device connected to the bus system, wherein the storage device includes program code; and
  a processor unit connected to the bus system, wherein the processing unit executes the program code to divide collectively sensitive data into a first partition for reassembly data, a second partition of the collectively sensitive data, and a third partition of the collectively sensitive data, wherein each of the second partition and the third partition are collectively nonsensitive in isolation, store the first partition in a translation table in a secure database, wherein the translation table is configured for use in assembling the collectively sensitive data from the second partition and the third partition, store the second partition of the collectively sensitive data in a first database associated with a first cloud computing environment, and store the third partition of the collectively sensitive data in a second database associated with a second cloud computing environment.

18. The apparatus of claim 17, wherein the processor unit further executes the program code to retrieve the second partition from the first database and the third partition from the second database, and assemble the collectively sensitive data from the second partition and the third partition using the translation table.

19. The apparatus of claim 18, wherein the processor unit further executes the program code to receive a request for the collectively sensitive data containing user information.

20. The apparatus of claim 19, wherein the processor unit executing the program code to assemble the collectively sensitive data from the second partition and the third partition using the translation table further comprises the processor unit executing the program code to retrieve a number of identifiers from the second partition that correspond to the user information, and retrieve a portion of the third partition based on the number of identifiers and the translation table.

* * * * *